June 11, 1963
E. L. FALLWELL
3,092,874
PRODUCTION OF THERMOPLASTIC POLYMERIC FILM
Filed July 17, 1961
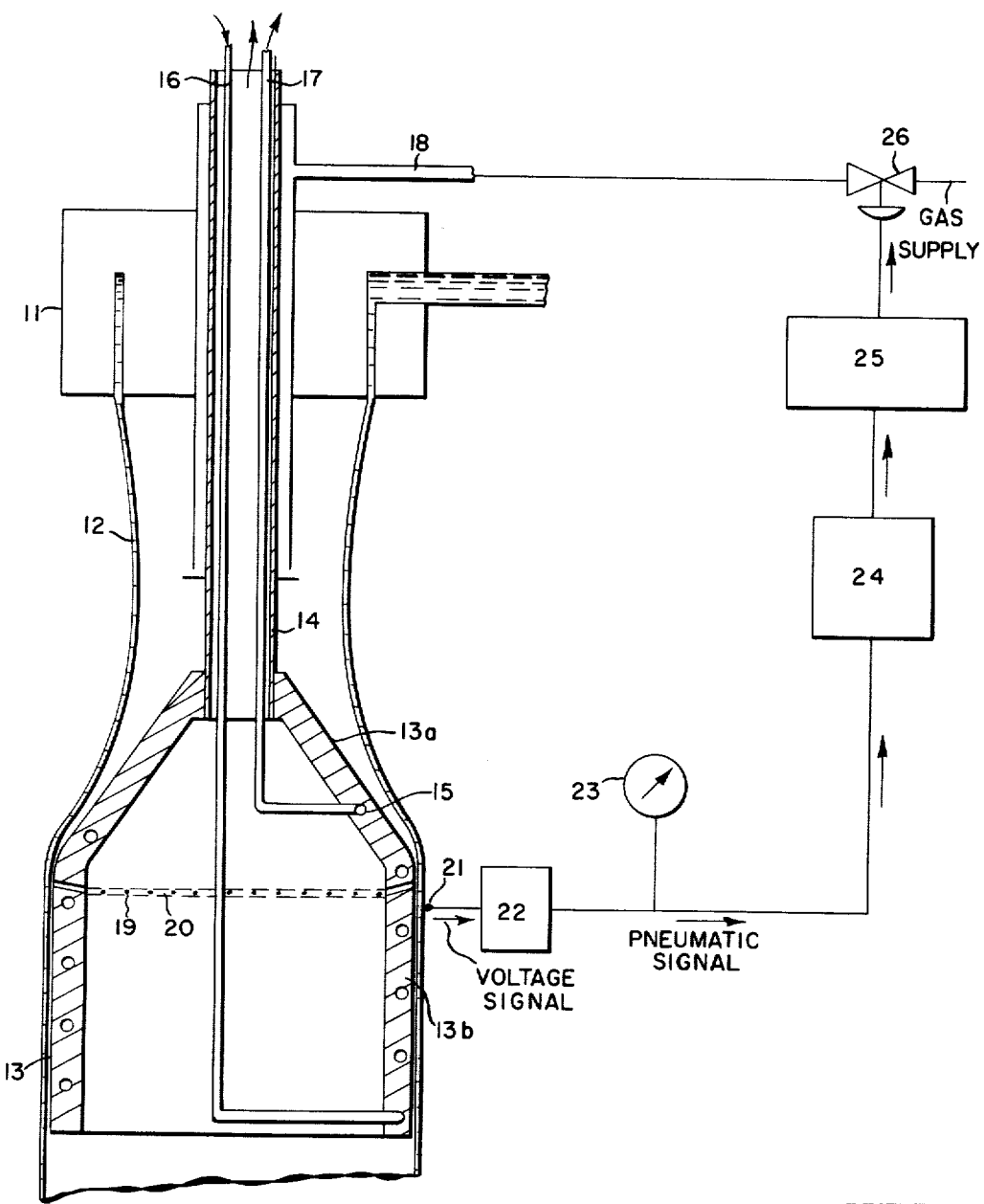
INVENTOR
ERNEST LYNWOOD FALLWELL
BY *P. Ralph Snyder*
ATTORNEY

United States Patent Office 3,092,874
Patented June 11, 1963

3,092,874
PRODUCTION OF THERMOPLASTIC POLYMERIC FILM
Ernest Lynwood Fallwell, Orange, Tex., assignor to E. I. du Pont de Nemours and Company, Wilmington, Del., a corporation of Delaware
Filed July 17, 1961, Ser. No. 124,438
7 Claims. (Cl. 18—14)

This invention relates to a process and apparatus for the forming of thermoplastics and, particularly, to an improved process for continuously forming tubular thermoplastic polymeric films to a predetermined cross section by use of gaseous pressure.

A particularly useful process for the continuous production of thermoplastic polymeric films comprises the steps, in sequence, of (1) Continuously extruding from an annular die a thermoplastic polymeric material in the form of a tubular sheet in its formative state;

(2) Inflating said tubular sheet while in the formative state to a predetermined diameter greater than that of said annular die by application of relatively low gaseous pressure internal of said tubular sheet while cooling said tubular sheet;

(3) Advancing said tubular sheet from the point of extrusion at a predetermined rate, while cooling said tubular sheet to a temperature below its formative state by conducting it over, in close proximity to but out of physical contact with the surface of a shaped cooler or mandrel of substantially circular cross section positioned coaxial with said annular die, said mandrel comprising at least a first portion of gradually increasing diameter and a second portion of non-increasing (or constant) diameter;

(4) Collapsing said tubular sheet to a flattened condition; and (5) Winding up flattened seamless tubing or, optionally, slitting said flattened tubing and winding up a plurality of separate flat films.

Procedures for carrying out steps (1) thru (3) above may be found in U.S. Patent 2,966,700 (Dyer and Heinstein) and U.S. Patent 2,987,765 (Cichelli), while numerous procedures for accomplishing steps (4) and (5) above are already familiar to those skilled in the tubular film production art.

In the production of tubing by the above-described process, for a given die (or, if an adjustable-lip die is employed, for a given lip spacing adjustment) and polymer throughput, the diameter and wall thickness of the tubing are controlled by proper adjustment of (a) the rate at which the tubing is withdrawn from the point of extrusion, i.e., the die face and (b) the gaseous pressure within the tubing. Polymers differing in such properties as optimum melt extrusion temperature and melt viscosity will, of course, necessitate somewhat different adjustments of these same process variables.

In the above-described process, expansion of the tubing occurs when the wall thickness of the section emerging from the die has been reduced by drawing in the plastic formative state until the melt tension of the polymer in this zone has been overcome by the gaseous pressure within the tubing. The tubing will continue to increase in diameter under the influence of this gaseous pressure and its wall thickness will continue to decrease under the combined influence of the drawing tension and diametrical expansion until the tubing has been cooled to a temperature below its formative state.

A relatively small amount of heat is lost from the expanding advancing tubular film by means of ambient convection exterior of the tubing. However, most of the sensible heat removed from the expanding, advancing tubular film is removed from the film by conduction through the gas layer separating it from contact with the cooling mandrel. Consequently, the rate at which the continuously advancing tubular film is cooled, is, for all practical purposes, directly determined by the thickness of this separating gas layer. If the gaseous pressure withtin the tubing intermediate between the die face and the cooling mandrel exceeds the desired level, over-expansion of the tubing (with consequent wall thickness reduction) results which moves the tubing farther from the cooling mandrel, frequently resulting in a break in the tubular film with consequent loss of production. Conversely, if the gaseous pressure falls below the desired level, under-expansion of the tubular film will result which may cause it to contact the mandrel, binding thereon, consequent drag forces frequently resulting in breaks.

In such an "open bubble" type of operation, gaseous blowing pressures within the tubular film intermediate between the die face and the cooling mandrel commonly range from about 0.005 to 0.5 inch of water, (above atmospheric pressure), and while internal gaseous pressures as low as .001 inch of water have been encountered in productive operation of such processes, pressures in excess of about 1.0 inch of water are rarely encountered. Since the differences between normal gaseous pressures and those that will cause either over-expansion or under-expansion of the tubing are measured in but a few thousandths of an inch of water, the difficulty of controlling the open bubble pressure by a device which directly measures changes in that pressure is at once apparent. Manometric means normally employed for measuring extremely small differences in fluid pressure are in general quite large and cumbersome in order to achieve an effective degree of sensitivity and accuracy. Moreover, the application of signals therefrom through a control means to modify the gaseous supply to the interior of the tubing is extremely difficult and susceptible of considerable error.

It is an object of this invention to provide an improvement in tubular film manufacturing processes embodied in the sequence of steps (1) thru (3) above. It is a further object to eliminate or at least greatly minimize loss of tubing production because of film breaks caused by either over-expansion or under-expansion of the tubular film. A more specific object is to provide improved ways and means for detecting and correcting variations in the open bubble pressure, involved in steps (2) and (3) above. The foregoing and additional object will more clearly appear from the description which follows.

These objects are realized by the present invention which, briefly stated, comprises in a process comprising the steps, in sequence, of (1) Continuously extruding from an annular die a thermoplastic polymeric material in the form of a tubular sheet in its formative state;

(2) Inflating said tubular sheet while in the formative state to a predetermined diameter greater than that of said annular die by the application of relatively low gaseous pressure internal of said tubular sheet while cooling said tubular sheet;

(3) Advancing said tubular sheet from the point of extrusion at a predetermined rate, while cooling said tubular sheet to a temperature below its formative state by conducting it over, in close proximity to but out of physical contact with the surface of a shaped cooler or mandrel of substantially circular cross section positioned coaxial with said annular die, said mandrel comprising at least a first portion of gradually increasing diameter and a second portion of non-increasing diameter;

the improvement which comprises sensing, preferably by means of a temperature sensing signal-generating member, variations in the temperature of said advancing tubular sheet at a point on said tubular sheet within the region bounded on the upstream side by the first cross section of maximum diameter of said cooling mandrel and on the downstream side by the substantially circumferential element of said tubular sheet downstream from which said tubular sheet is in substantial thermal equilibrium with the surface of said cooling mandrel (i.e., the temperature of said tubular sheet is, for all practical purposes, no longer decreasing), and varying said internal gaseous pressure inversely in response to changes in the temperature signal level of the temperature signal from said sensing member caused by changes in temperature at said point on said tubular sheet to oppose further change in said temperature signal and to restore said temperature signal to its original value.

The process and apparatus will now be described with reference to the accompanying drawing wherein the single figure is a generally diagrammatic representation of one preferred embodiment of the invention.

Referring to the drawing: The apparatus comprises an annular die 11 through which the tubular thermoplastic film 12 is extruded in the form of continuous tubing. The tubing is advanced over hollow cooling mandrel 13, having a smooth surface and a circular cross section, by roller advancing means (not shown) positioned downstream from said mandrel. The cooling mandrel is adjustably suspended a predetermined distance from the face of the die 11 by being bolted to a hollow support post 14, the latter adapted to fit through the center or core of the die. The mandrel is composed of a frustoconical section 13a, the narrow end of which faces the die, and a cylindrical section 13b. The wall of the cooling mandrel has a coil 15 embedded therein. Cooling fluid is passed through the coil, the fluid being fed in at the inlet 16 and passing out the outlet 17. Preferably, both annular die 11 and cooling mandrel 13 are rotated in the same direction at the same radial velocity whereby to distribute and minimize the effect of film thickness disuniformities traceable to lack of uniform melt distribution around the circumference of die 11. The process can also be operated with the die and the cooler rotated in opposite directions or one member can be rotated while the other member remains in fixed position.

Air or equivalent gaseous blowing medium is introduced under pressure through the feed line 18. The gas is at a pressure effective to expand the freshly extruded tubing to a predetermined diameter that is slightly larger (e.g., up to about 20 mils larger) than the maximum diameter of the cooling mandrel. As the tubing is advanced over the mandrel by conventional roller advancing means (not shown), to prevent undue expansion of the tubing, excess gas is vented through a series of holes 19 spaced about 1 inch apart in the wall of the cooling mandrel, which holes communicate with the hollow interior of the mandrel. Although a single row of holes 19 is shown in FIGURE 1, any number of rows may be used. The rows are preferably located in circumferential grooves 20. From the interior of the mandrel, the gas is passed through the hollow support post 14 to the atmosphere or to any other area maintained at a slightly lower pressure than the gas within the tubular film intermediate between the die face and the cooling mandrel. As an alternative, the pressure relief holes 19 need not communicate with the hollow interior of the mandrel. Instead, the mandrel may be constructed with an inner shell which may communicate directly with the atmosphere.

Temperature sensing signal-generating element 21, in this instance shown as a thermocouple junction in contact with the exterior of tubular film 12, is positioned to sense the temperature of tubular film 12 at a point in its advance past cooling mandrel 13 within the region bounded on the upstream side by the first cross section of maximum diameter of cooling mandrel 13 and on the downstream side by the substantially circumferential element of said tubular film downstream from which said tubular film is in substantial thermal equilibrium with the surface of said cooling mandrel; i.e., downstream from which the temperature of said tubing is, for all practical purposes, no longer decreasing.

Voltage signals from temperature sensing element 21 are transmitted to an electropneumatic transducer 22, of conventional design, which converts them to proportionate pneumatic signals which are employed to actuate pneumatically operated temperature indicating gauge 23 (which may optionally be a recording indicator) and simultaneously are fed to inverse derivative pneumatic controller 24 also of commercially available conventional design, the output signal from controller 24 being fed to a conventional proportionating and resetting controller 25, pneumatic signals from this latter unit being applied to actuate diaphragm control valve 26 in gas supply line 18 in such a manner that an increase, for example, in voltage signal from temperature sensing element 21 will bring about a reduction in gas flow rate through gas supply line 18. Thus an increase in temperature of the tubular film as sensed by temperature sensing element 21 will bring about a proportionate decrease in the gaseous pressure within the tubular film intermediate between the die face and the cooling mandrel, said decrease in gaseous pressure permitting the tubular film to approach more closely the surface of the cooling mandrel, thereby transferring more heat from the tubular film and reducing its temperature, which eliminates the signal that initiated the change described immediately above.

In place of a contacting thermocouple, the temperature sensing element 21 may be a non-contacting radiation sensing device, tuned for selective reception of and response to a particular wave length of energy emanating from the tubular film. When a contacting thermocouple is employed, some means (not shown) for maintaining such contact despite minor shifts in position of the tubular film 12 must be used. For example, a low tension spring may be employed to urge the thermocouple into gentle though positive contact with the film. While for convenience of installation and subsequent adjustment it is preferable to employ a fixed-position temperature sensing device positioned external to the advancing tubular film, it is permissible to employ either a contacting or a non-contacting temperature sensing element positioned on the cooling mandrel itself. In the case where the cooling mandrel is rotating, such a temperature sensing element would sense the temperature on the tubular film along the helical path resulting from the combined motions of mandrel rotation and linear advance of the tubular film. Installations interior of the tubular film are less preferred because of the necessity of providing slip rings to bring voltage signals outside of the tubing to the control center. Further, changing the location of a temperature sensing device mounted on the cooling mandrel to optimize its location for the production of films differing in lineal rate and thickness is obviously more difficult than changing the location of an externally positioned temperature sensing element.

It will be understood by those skilled in the art that an electrically responsive control system, operating on an electrical rather than on a pneumatic signal, may be used in place of the system described above. In such a system, the electropneumatic transducer would be replaced by an electronic amplifying transmitter and the pneumatic type temperature indicating gauge would be replaced with an electrically responsive indicating gauge.

It will also be understood that in the event that the control equipment should become inoperable, a skilled operate diaphragm control valve 26 to change the flow technician may sense the temperature and manually rate of gas in supply line 18 to effect changes in the gaseous pressure within the tubular film 12 of such magnitude as to oppose changes in the normally indicated control temperature.

To provide a basis for effective control of process, the temperature sensing element preferably should be so positioned that it senses the temperature of the tubing after said tubing has been blown to its predetermined maximum diameter (i.e., slightly larger than the maximum diameter of the cooling mandrel) and it is essential that it be positioned to sense the temperature of the tubing before said tubing has attained a condition of substantial thermal equilibrium with the surface of said cooling mandrel, or in other words, the temperature of the advancing tubing must be sensed while the temperature is still decreasing.

This sensing point must therefore be within the region bounded on the upstream side by the first cross section of maximum diameter of said cooling mandrel and on the downstream side by the substantially circumferential element of said tubular sheet downstream from which said tubular sheet is in substantial thermal equilibrium with the surface of said cooling mandrel, said "circumferential element" hereinafter conveniently termed the "quench line." The exact location of the quench line relative to the first cross section of maximum diameter of the cooling mandrel will depend on the heat transfer balance existing for any given set of process conditions and will be affected by numerous process variables. For example, an increase in melt temperature, melt thickness, polymer throughput rate, internal gaseous pressure, inlet temperature of coolant circulating in the mandrel or film advancing speed as well as a decrease in the coolant flow rate tends to displace the quench line farther downstream.

To position the temperature sensing element properly, the quench line is first roughly located by a tactile impression technique. The technician or operator gently touches the advancing tubing with a finger at a point substantially downstream from the region wherein experience indicates he may expect to find the quench line and, maintaining this gentle contact, gradually moves his finger upstream until an unmistakably sharp increase in temperature is felt. The point where this sharp increase in temperature is felt is termed the "hot line." Although varying with individuals, the hot line temperature of the film will normally be found in the range of 50–60° C.

Even when considering the differences in temperature at which cooling water is available from natural and refrigerated sources, widely varying coolant flow rates and the many other process variables, the quench line for any particular operational set-up of the process of this invention will generally be found downstream from the hot line within a distance of from about ½ inch to less than about 3 inches. Of course contact thermocouple means may be employed to locate the quench line more accurately.

If a contact thermocouple is to be employed as the temperature sensing element, in order to minimize marking of the tubing by even gentle contact of the termocouple therewith, it is convenient to position the thermocouple to contact the tubing at a point just slightly downstream from the hot line.

The higher the temperature of the tubing (at the sensing point) is above its quench line temperature, the better is the response of the control system. Therefore even when using a contact thermocouple it is desirable to establish the sensing point at or upstream from the hot line. To avoid unnecessary film loss due to the slightly increased amount of marking which such a contact thermocouple will cause in this region, the thermocouple is conveniently positioned so that any resulting mark will coincide with a crease of the tubing (if it is to be wound up as flat seamless tubing) or with one of the elements along which the tubing is slit (if it is to be wound up as a plurality of separate films).

Of course it will be understood that the use of a radiation-sensitive type of temperature sensing element will permit the sensing of the temperature of the tubular film at points substantially farther upstream from the quench line than is permissible with a contacting type thermocouple without incurring the risk of marking the film.

The following production data further exemplify the principles and practice of this invention.

Tubular films of low and medium density branched polyethylene; high density linear polyethylene; blends of branched and linear polyethylene; and linear polypropylene were manufactured in a continuing series of runs over an extended period of time divided into three approximately equal parts. The equipment used was essentially as pictured in the accompanying drawing. During each period, conditions were varied widely from run to run, ranging from the production of nominally 3-mil thick film at lineal rates in the vicinity of about 70 ft. per minute to 1-mil thick film at lineal rates in excess of 200 ft. per minute. Equipment capacity ranged from a 24-inch diameter annular die coupled with a 33-inch maximum diameter cooling mandrel to a 32-inch diameter annular die coupled with a 47-inch maximum diameter cooling mandrel. Air supply rates ranged from about 0.1 to about 6 cubic feet per minute and gaseous blowing pressures within the tubing as low as 0.003 and as high as about 0.05 inch of water were measured. During each period over 300,000 pounds of polymer were extruded.

During the first period, gaseous pressure within the tubing intermediate between the die and the cooling mandrel was controlled by manual adjustment of the gas supply line valve, such adjustments being made by the process operator based on his observation and judgement that the profile of the tubing advancing from the die and over the cooling mandrel was or was not optimum. During this period, yield losses due to film breaks traceable to either over- or under-expansion of the tubing ranged from about 11% to about 19% of the total polymer extruded, averaging about 16%.

During the second period, as each run was being adjusted to satisfactory process conditions, a 22-gauge iron-constantan thermocouple was positioned exterior to the advancing tubing and urged by light spring tension means into gentle contact with the surface of the advancing tubing at a point (varying from run to run) within the region bounded on the upstream side by the first cross section of maximum diameter of the cooling mandrel, and on the downstream side by the aforementioned quench line; the location of the quench line in each case having been estimated by reference to the hot line, itself having been located by the tactile impression technique hereinbefore described. The thermocouple was connected to a Brown Model T158 Electropneumatic Transducer [1], 0–100° C. range. The transducer converted the voltage signals received from the thermocouple into proportionate pneumatic signals which were employed directly to actuate a pneumatically operated Moore Dial Temperature Indicator [2], 0–100° C. range. When satisfactory operation of each run was attained, the temperature indicated on the Moore gauge (control level temperature) was observed by the process operator, who thereafter attempted to maintain that temperature unchanged by manual adjustment of the gas supply line valve to decrease gaseous pressure within the tubing if the control level temperature increased beyond the permissible control range, and vice versa. Depending on the combined interaction of such process variables as the particular polymer being extruded, the melt temperature, polymer throughput rate, lineal tubing advancing rate, die and mandrel sizes and relative spacing, coolant flow rates and inlet temperature, and gas supply flow rate and delivery pressure, control level temperatures ranging from about 40° C. to about

[1] Manufactured by Brown Instrument Division of Minneapolis-Honeywell, Philadelphia, Pennsylvania.
[2] Manufactured by Moore Products Company, Philadelphia, Pennsylvania.

100° C. were successfully employed. During this period, yield losses computed on the same basis as for the first period ranged from about 6% to about 15% of the total polymer extruded, averaging about 11%.

During the third period, the contact thermocouple and transducer were employed during each run in the manner described above for the second period. However, during this period, pneumatic signals from the transducer were employed not only to actuate the Moore temperature indicating gauge but were also fed simultaneously to a Moore Model 59 Nullmatic Derivative Control Unit [1], operating in the inverse mode, the pneumatic output from this controller being fed to a Moore Model 5311 MT4R Recording Control Station [1] coupled with a Moore Model 56 M Proportional and Reset Controller [1]. The pneumatic output signals from the latter controller were applied to actuate a diaphragm control valve [2] in the air supply line in such a way that an increase above the control level of the temperature sensed by the thermocouple automatically caused a proportionate decrease in the rate of air supply to the interior of the tubing, and vice versa. Depending on the aforementioned process variables, control level temperatures ranging from about 40° C. to about 100° C. were successfully employed. Yield losses during this period, computed on the same basis as for the first and second periods, ranged from about 2% to about 5% of the total polymer extruded, averaging 3.5%.

From the foregoing description and data the advantages of a control system based on control of internal gaseous pressure in response to film temperature changes at a critical point, in accordance with the present invention should be obvious. In contrast, a method for controlling the rate of cooling of the expanding, advancing tubular film by varying the internal gaseous pressure in response to direct measurement of the pressure itself can act only to oppose changes in said pressure, regardless of the factor causing the change. This can sometimes aggravate rather than alleviate an off-control situation. For example, assume a momentary reduction in the amount of polymer melt issuing from the annular die. The thinner section of melt will cool more rapidly and will offer more resistance to the internal gaseous pressure and the tubing will expand less. With the gas supply rate unchanged, the consequent decrease in volume internal of said tubing intermediate between the die and the cooling mandrel will be accompanied by a proportionate increase in the pressure within that volume. A pressure-sensing control system will call for less gas from the supply line which will produce further contraction of the tubing which will result in a film break.

The complete versatility of the control method employed in this invention will be at once apparent on analysis of the following suppositional situations.

(1) An increase in gas supply line pressure will cause an increase in the diameter of the tubing, moving it further form the cooling mandrel, with a consequent increase in the temperature of the tubing at the sensing point. This temperature increase brings about a proportionate decrease in gas supply rate which acts to reverse the off-control sequence described above.

(2) An increase in melt temperature reduces the melt strength of the polymeric material and permits the available gaseous pressure to expand the tubing to a larger diameter, thus moving it farther away from the cooling mandrel with a consequent increase in the temperature of the tubing at the sensing point. As in (1) above, this temperature increase brings about a corrective decrease in the gaseous pressure within the tubing.

(3) An increase in the amount of polymeric melt issuing from the annular die decreases the effective melt strength because of the higher effective film temperature on the cooling mandrel and the available gaseous pressure will expand the tubing more than before. The tubing is now farther from the cooling mandrel and its temperature at the sensing point is consequently higher. This increase in temperature brings about a corrective decrease in the gaseous pressure within the tubing.

(4) An increase in the lineal rate of advance of the tubing reduces the thickness of the air film between the polymer melt and the cooling mandrel, thus moving it closer to the cooling mandrel with a consequent decrease in the temperature at this sensing point. This temperature decrease brings about a corrective increase in the gaseous pressure in the tubing.

The improved process of this invention thus permits the continuous production of tubular films from thermoplastic polymers over long and sustained production runs by greatly minimizing production losses due to breaks in the tubing resulting from either over-expansion or under-expansion thereof arising from a wide variety of causes.

I claim:

1. In a process comprising the steps in sequence, of (1) continuously extruding from an annular die a thermoplastic polymeric material in the form of a tubular sheet in its formative state;

(2) inflating said tubular sheet while in the formative state to a predetermined diameter greater than that of said annular die by the application of relatively low gaseous pressure internal of said tubular sheet while cooling said tubular sheet;

(3) advancing said tubular sheet from the point of extrusion at a predetermined rate, while cooling said tubular sheet to a temperature below its formative state by conducting it over, in close proximity to but out of physical contact with the surface of a shaped cooler or mandrel of substantially circular cross section positioned coaxial with said annular die, said mandrel comprising at least a first portion of gradually increasing diameter and a second portion of non-increasing diameter;

the improvement which comprises sensing the temperature of said advancing tubular sheet at a point on said tubular sheet within the region bounded on the upstream side by the first cross-section of maximum diameter of said cooling mandrel and on the downstream side by the substantially circumferential element of said tubular sheet downstream from which said tubular sheet is in substantial thermal equilibrium with the surface of said cooling mandrel, and varying said gaseous pressure in response to a change in temperature at the said point on said tubular film at which the temperature is sensed to oppose further change of temperature in the same direction and restore the temperature of the film at said point to its original value.

2. In a process comprising the steps, in sequence, of (1) continuously extruding from an annular die a thermoplastic polymeric material in the form of a tubular sheet in its formative state;

(2) inflating said tubular sheet while in the formative state to a predetermined diameter greater than that of said annular die by the application of relatively low gaseous pressure internal of said tubular sheet while cooling said tubular sheet;

(3) advancing said tubular sheet from the point of extrusion at a predetermined rate, while cooling said tubular sheet to a temperature below its formative state by conducting it over, in close proximity to but out of physical contact with the surface of a shaped cooler or mandrel of substantially circular cross section positioned coaxial with said annular die, said mandrel comprising at least a first portion of gradually increasing diameter and a second portion of non-increasing diameter;

---

[1] Manufactured by Moore Products Co., Philadelphia, Pennsylvania.
[2] Manufactured by Research Controls, Tulsa, Oklahoma.

the improvement which comprises sensing, by means of a temperature sensing signal-generating member, variations in the temperature of said advancing tubular sheet at a point on said tubular sheet within the region bounded on the upstream side by the first cross section of maximum diameter of said cooling mandrel and on the downstream side by the substantially circumferential element of said tubular sheet downstream from which said tubular sheet is in substantial thermal equilibrium with the surface of said cooling mandrel (i.e., the temperature of said tubular sheet is, for all practical purposes, no longer decreasing), and varying said internal gaseous pressure in response to changes in the temperature signal level of the temperature signal from said sensing member caused by a change in temperature at said point on said tubular sheet to oppose further change in said temperature signal and to restore said temperature signal to its original value.

3. The process of claim 2 wherein said annular die and said cooling mandrel are constantly rotated in the same direction at the same radial velocity.

4. In an apparatus comprising in combination means for extruding thermoplastic organic material in the form of a continuous tubing, said means including a die having an annular extrusion orifice, a mandrel of substantially circular cross-section positioned adjacent to said orifice and coaxial therewith, said mandrel comprising at least a first portion of gradually increasing diameter and a second portion of non-increasing diameter, means for advancing continuous tubing extruded from said orifice over and past said mandrel, valved means for supplying a gaseous medium within the tubing between said orifice and said mandrel at a pressure effective to increase the diameter of the tubing while in the formative state and to maintain said tubing just out of physical contact with said mandrel, and means for maintaining said mandrel at a predetermined reduced temperature to render said mandrel effective to cool tubing passing thereover; the improvement which comprises, in combination, temperature sensing signal-generating means located at a predetermined point closely adjacent the surface of said second portion of said mandrel, and operative to sense the temperature of said tubing passing over said mandrel at said point and to generate a signal directly proportionate to the temperature of the tubing at said point.

5. The apparatus of claim 4 wherein said temperature sensing signal-generating means is a thermocouple, and is further located to contact the outer surface of the tubing passing over said mandrel.

6. In an apparatus comprising in combination means for extruding thermoplastic organic material in the form of a continuous tubing, said means including a die having an annular extrusion orifice, a mandrel of substantially circular cross-section positioned adjacent to said orifice and coaxial therewith, said mandrel comprising at least a first portion of gradually increasing diameter and a second portion of non-increasing diameter, means for advancing continuous tubing extruded from said orifice over and past said mandrel, valved means for supplying a gaseous medium within the tubing between said orifice and said mandrel at a pressure effective to increase the diameter of the tubing while in the formative state and to maintain said tubing just out of physical contact with said mandrel, and means for maintaining said mandrel at a predetermined reduced temperature to render said mandrel effective to cool tubing passing thereover; the improvement which comprises, in combination, temperature sensing signal-generating means located at a predetermined point closely adjacent the surface of said second portion of said mandrel, and operative to sense the temperature of said tubing passing over said mandrel at said point and to generate a signal directly proportionate to the temperature of the tubing; at said point, transducer means responsive to changes in signal from said temperature sensing means, said responsive means being operative to modify the form of and retransmit said signal, control means operative to receive said modified, retransmitted signal and to operate said valved means in accordance with variations in said signal to change, in inverse proportion to changes in said signal, the rate of gas supply to the interior of the tubing whereby to oppose further change in said signal in the same direction and to restore said signal to its original level.

7. The apparatus of claim 6 wherein said temperature sensing signal-generating means is a thermocouple, and is further located to contact the outer surface of the tubing passing over said mandrel.

References Cited in the file of this patent
UNITED STATES PATENTS

| | | |
|---|---|---|
| 2,966,700 | Dyer et al. | Jan. 3, 1961 |
| 2,987,765 | Cichelli | June 13, 1961 |

UNITED STATES PATENT OFFICE
CERTIFICATE OF CORRECTION

Patent No. 3,092,874                                       January 11, 1963

Ernest Lynwood Fallwell

It is hereby certified that error appears in the above numbered patent requiring correction and that the said Letters Patent should read as corrected below.

Column 4, lines 72 and 73, for "operate diaphragm control valve 26 to change the flow technician may sense the temperature and manually" read -- technician may sense the temperature and manually operate diaphragm control valve 26 to change the flow --.

Signed and sealed this 11th day of February 1964.

(SEAL)
Attest:

ERNEST W. SWIDER
Attesting Officer

EDWIN L. REYNOLDS
Acting Commissioner of Patents